(12) United States Patent
Kuroda et al.

(10) Patent No.: US 8,232,914 B2
(45) Date of Patent: Jul. 31, 2012

(54) RADAR APPARATUS

(75) Inventors: Hiroshi Kuroda, Hitachinaka (JP);
Kazuo Matsuura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 581 days.

(21) Appl. No.: 12/187,093

(22) Filed: Aug. 6, 2008

(65) Prior Publication Data
US 2009/0085796 A1 Apr. 2, 2009

(30) Foreign Application Priority Data
Aug. 8, 2007 (JP) ................. 2007-207092

(51) Int. Cl.
*G01S 13/32* (2006.01)
*G01S 7/35* (2006.01)
*G01S 13/00* (2006.01)
*G01S 13/93* (2006.01)

(52) U.S. Cl. ............... 342/129; 342/27; 342/70; 342/89; 342/118; 342/128; 342/175; 342/195; 342/196; 342/200

(58) Field of Classification Search ............... 342/70–72, 342/118, 128–145, 175, 192–197, 200–205, 342/22, 42, 51, 82–103, 159–164, 13, 27, 342/28, 73, 74, 81, 120
See application file for complete search history.

(56) References Cited

U.S. PATENT DOCUMENTS

| | | | | |
|---|---|---|---|---|
| 3,662,388 A | * | 5/1972 | Mott et al. | 342/192 |
| 3,879,661 A | * | 4/1975 | Collins | 342/192 |
| 3,940,766 A | * | 2/1976 | Cross et al. | 342/95 |
| 3,950,750 A | * | 4/1976 | Churchill et al. | 342/196 |
| 4,003,052 A | * | 1/1977 | Adelman et al. | 342/162 |
| 4,015,260 A | * | 3/1977 | Campbell, Jr. | 342/162 |
| 4,268,828 A | * | 5/1981 | Cribbs et al. | 342/196 |
| 4,404,562 A | * | 9/1983 | Kretschmer et al. | 342/194 |
| 4,450,444 A | * | 5/1984 | Wehner et al. | 342/196 |
| 4,652,882 A | * | 3/1987 | Shovlin et al. | 342/93 |
| 4,667,200 A | * | 5/1987 | Gellekink et al. | 342/202 |
| 4,680,588 A | * | 7/1987 | Cantwell | 342/92 |
| 4,710,772 A | * | 12/1987 | Cantwell et al. | 342/92 |
| 4,713,662 A | * | 12/1987 | Wiegand | 342/13 |
| 4,768,035 A | * | 8/1988 | Thurber et al. | 342/194 |

(Continued)

FOREIGN PATENT DOCUMENTS
DE 103 49 919 A1 5/2005
(Continued)

OTHER PUBLICATIONS
European Search Report dated Nov. 11, 2008 (Seven (7) pages).
(Continued)

*Primary Examiner* — Bernarr Gregory
(74) *Attorney, Agent, or Firm* — Crowell & Moring LLP

(57) ABSTRACT

A distance measuring apparatus comprising a transmission antenna to radiate a transmission radio wave; a reception antenna to receive a reflected signal from a target; an analog-to-digital converter to perform an analog-to-digital conversion for converting a reception signal; and a signal processing unit to process the converted signal and to detect the target, in which a transmission frequency of the transmission radio wave to be radiated is switched at a timing synchronized with a sampling frequency of the analog-to-digital conversion, the transmission frequency is switched in accordance with an arbitrary pattern within a frequency band, and the reception signal is rearranged in order on the basis of the arbitrary pattern at a time of the transmission to then be subject to a radar signal processing.

12 Claims, 17 Drawing Sheets

U.S. PATENT DOCUMENTS

| | | | | |
|---|---|---|---|---|
| 5,610,613 | A * | 3/1997 | Hazard et al. | 342/195 |
| 5,667,373 | A * | 9/1997 | Wright et al. | 342/81 |
| 5,867,119 | A * | 2/1999 | Corrubia et al. | 342/194 |
| 5,900,833 | A * | 5/1999 | Sunlin et al. | 342/22 |
| 5,986,602 | A * | 11/1999 | Frink | 342/128 |
| 5,999,119 | A * | 12/1999 | Carnes et al. | 342/135 |
| 5,999,561 | A * | 12/1999 | Naden et al. | 375/142 |
| 6,023,238 | A | 2/2000 | Cornic et al. | |
| 6,028,548 | A | 2/2000 | Farmer | |
| 6,081,226 | A * | 6/2000 | Caldwell et al. | 342/200 |
| 6,121,917 | A * | 9/2000 | Yamada | 342/128 |
| 6,204,805 | B1 * | 3/2001 | Hager | 342/120 |
| 6,317,074 | B1 * | 11/2001 | Johnson | 342/82 |
| 6,448,926 | B1 * | 9/2002 | Weinberg et al. | 342/51 |
| 6,611,225 | B2 * | 8/2003 | Mitsumoto et al. | 342/70 |
| 6,703,967 | B1 | 3/2004 | Kuroda et al. | |
| 7,167,124 | B2 * | 1/2007 | Annan et al. | 342/195 |
| 7,352,320 | B2 * | 4/2008 | Enomoto et al. | 342/70 |
| 7,482,967 | B2 * | 1/2009 | Beharrell | 342/20 |
| 2003/0179128 | A1 | 9/2003 | Mende et al. | |
| 2005/0156780 | A1 | 7/2005 | Bonthron et al. | |
| 2008/0042895 | A1 | 2/2008 | Inaba | |
| 2008/0068251 | A1 | 3/2008 | Meinecke et al. | |

FOREIGN PATENT DOCUMENTS

| | | |
|---|---|---|
| EP | 1 757 953 A1 | 2/2007 |
| JP | 5-126943 A | 5/1993 |
| JP | 10-282227 A | 10/1998 |
| JP | 3203600 B2 | 6/2001 |
| JP | 2002-107447 A | 4/2002 |
| JP | 2002-156447 A | 5/2002 |
| JP | 2002-513468 A | 5/2002 |
| JP | 2004-511783 A | 4/2004 |
| JP | 3746235 B2 | 12/2005 |
| WO | 2006/085352 A1 | 8/2006 |

OTHER PUBLICATIONS

Japanese office action dated Jul. 28, 2009.
Japanese office action dated Jan. 19, 2010.

* cited by examiner

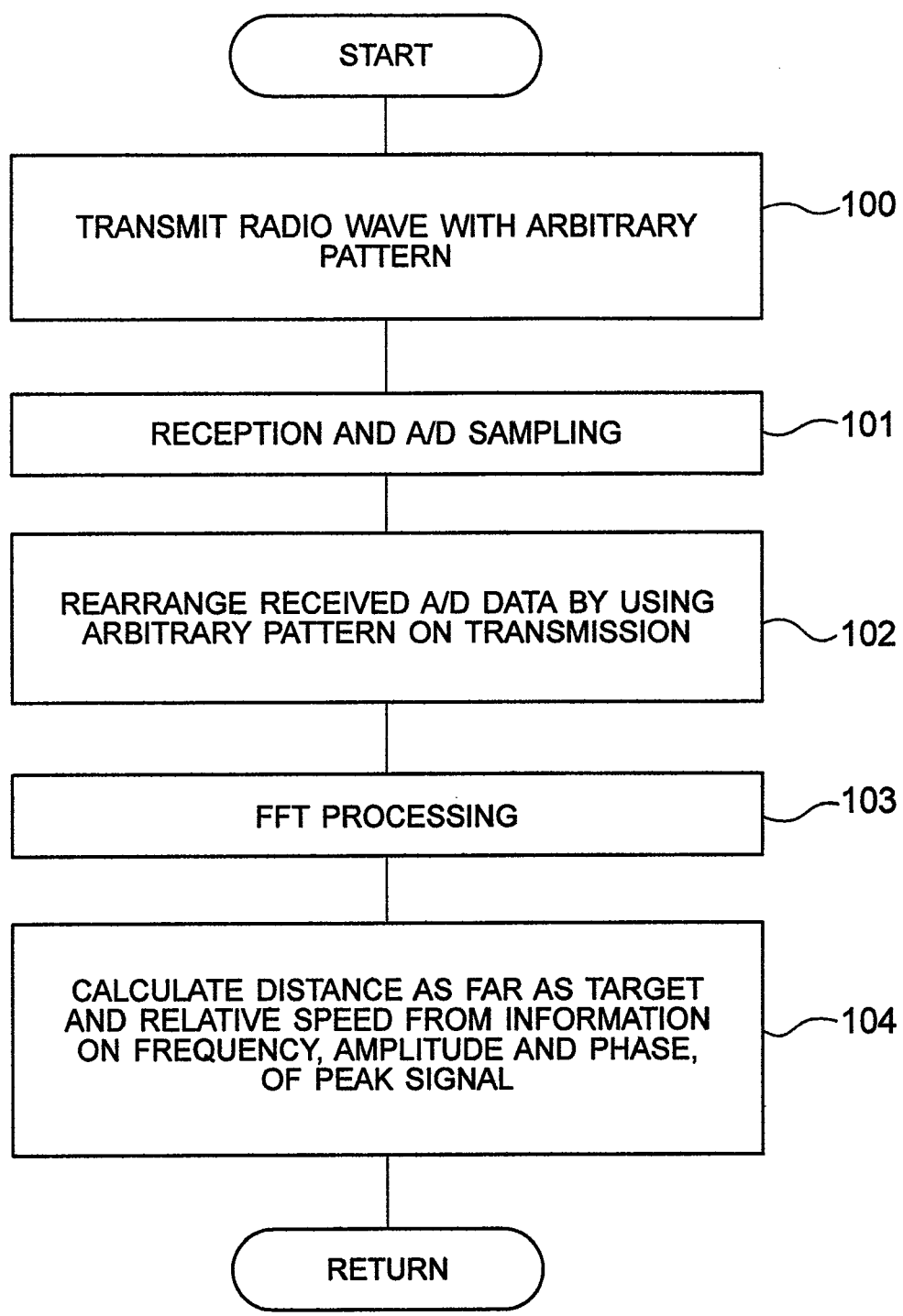

RADAR APPARATUS

BACKGROUND OF THE INVENTION

The present invention relates to a measuring device to be mounted on a vehicle, such as automobile, and to measure distances from various targets around an own vehicle and also measure relative speeds between them, and particularly to a distance measuring apparatus to realize a high axial resolution by a simple hardware.

A millimeter-wave radar to be used for the automobile radiates a radio wave of a millimeter-wave band, receives reflected waves from the targets such as other vehicles and obstacles, and detects a propagated time period of the waves, an intensity of the reflected waves, a Doppler shift amount of frequencies, etc. The distance from the target and the relative speed between the own vehicle and the target are then measured from a result of the detection. There are several methods to measure the distance and srelative speed.

Japanese Patent No. 3203600 discloses a dual-frequency CW (Continuous Wave) method which is a typical method of the millimeter-wave radar used for the automobiles. The dual-frequency CW radar measures a relative speed of a target in accordance with the Doppler shift at a reception frequency to then measure a distance as far as the target in accordance with phase information of reception signals at the two frequencies.

A principle of the dual-frequency CW method will be described with reference to FIGS. 18A to 18C. In the case of using a single transmitter, two frequencies f1 and f2 are transmitted while they are switched alternately, as shown in FIG. 18A. In the case of a related technique of the radar for use in the automobiles, a frequency for switching periodically the frequencies f1 and f2 is about 100 Hz, and a difference $f_{dev}$ between the two frequencies f1 and f2 is about 300 kHz.

In a reception side, reception signals at the respective transmission frequencies f1, f2 are subject to a fast Fourier transformation (FFT) processing to obtain frequency spectra of reception beat signals.

FIG. 18B shows an example of a reception frequency spectrum. A signal (target information) as shown in FIG. 18B emerges at a frequency (Doppler frequency) corresponding to a relative speed of the target on the frequency spectrum, when the target emerges.

In the case of the dual-frequency CW method as a radar system using the Doppler frequency, target information can be obtained from the two transmission frequencies f1, f2. It is therefore possible to separate and detect a plurality of targets each having a different relative speed from the foregoing obtained information of the frequency spectra, and a relative speed "Rate" for each of the separated and detected targets is calculated from the Doppler frequency ft by using the following expression (1).

$$\text{Rate} = \frac{ft \cdot c}{2fc} \quad (1)$$

where fc is a transmission frequency, and c is the velocity of light.

FIG. 18C shows a vector representation of a phase and amplitude in frequency spectrum information at two reception signals in the dual-frequency CW method. Here, a phase angle difference θ between two power spectrums F1, F2 is proportional to a distance as far as the target.

Assuming that the power spectrums F1, F2 are represented by complex numbers Signal (1), Signal (2), the distance "Range" is calculated by the following expression (2) in accordance with the phase difference θ between the two frequencies since the difference $f_{dev}$ between the transmission frequencies f1, f2 is known.

$$\text{Range} = \frac{c \times \theta}{4\pi \times f_{dev}} \quad (2)$$

where $f_{dev}$=f2−f1, θ=arg(Signal (1))−arg(Signal (2)), and c is the velocity of light.

As described above, the radar using the dual-frequency CW method calculates the relative speed of the target in accordance with the Doppler frequency to then calculate the distance as far as the target in accordance with the phase angle.

Japanese Patent No. 3746235 relates to a distance measuring apparatus which utilizes a Doppler shift of a reflected wave from a target under measurement to separate a plurality of targets and to detect each of the targets. The foregoing distance measuring apparatus radiates a radio wave, receives a reflected wave from the target, and detects the target, in which the apparatus includes: a transmitting unit that transmits continuously a first frequency signal for a predetermined time period or more, transmits continuously a second frequency signal having a predetermined frequency difference from the first frequency, and transmits a signal having a frequency difference of an integer multiple equal to or greater than twice the predetermined frequency difference from the first frequency over signals at N frequencies, where N is an integer equal to or greater than one; a receiving unit that measures a Doppler frequency of the reflected wave from the target at each of the respective transmission frequencies of the first frequency signal, second frequency signal, and N frequency signals; and a detection processing unit that separates the plurality of targets to then detect each of the targets.

In the case of the radar apparatus utilizing the foregoing Doppler shift, there is a problem that the Doppler frequency is tuned into zero to cause a target not to be detected, in a condition where the distance between the radar and target is not changed in time, that is, the relative speed is zero.

Further, in the case where plural targets emerge at the same speed, there is also a problem that it is difficult to separate the targets and detect each of the distances in high accuracy.

SUMMARY OF THE INVENTION

In the light of the foregoing problems, an object of the invention is to provide a distance measuring apparatus including a transmission antenna to radiate a transmission radio wave; a reception antenna to receive a reflected signal from a target; an analog-to-digital (A/D) converter to perform an analog-to-digital conversion for converting a reception signal; and a signal processing unit to process the converted signal and to detect the target, in which a transmission frequency of the transmission radio wave to be radiated is switched at a timing synchronized with a sampling frequency of the analog-to-digital conversion.

Further, in the distance measuring apparatus, the transmission frequency is transmitted continuously at a sampling period of the analog-to-digital conversion (as an inverse number of the sampling frequency).

Further, the distance measuring apparatus further includes a switching function in the signal processing unit that switches the transmission frequencies in accordance with a predetermined arbitrary pattern Further, in the distance measuring apparatus, the switching function uses a Fourier transformation processing to be executed for a predetermined period to switch the transmission frequency in accordance with the arbitrary pattern as a single unit of the predetermined period of executing the Fourier transformation processing.

Further, in the distance measuring apparatus, the arbitrary pattern includes a pattern of a butterfly computation to be used for the fast Fourier transformation.

Further, in the distance measuring apparatus, the arbitrary pattern is stored in advance, and the Fourier transformation processing is executed after decoding the reception signals in accordance with the arbitrary pattern stored at the reception.

Further, in the distance measuring apparatus, the arbitrary pattern includes a pattern in accordance with a pseudo random code.

Further, in the distance measuring apparatus, the arbitrary pattern includes a pattern, frequencies of which are switched stepwise, while a predetermined frequency difference is kept constant.

Further, in the distance measuring apparatus, a difference between a previously transmitted frequency and a presently transmitted frequency is restricted equal to or less than the predetermined frequency difference, when the transmission frequency is switched.

Further, the distance measuring apparatus further includes a gate function to switch whether the reception signal is passed through on the reception, wherein the received signal is prohibited to pass through for a predetermined time period from a time when the transmission frequency is switched.

Further, in the distance measuring apparatus, the predetermined time period is a time until an oscillator for generating the transmission signal is made stable after the transmission frequency varies.

Further, in the distance measuring apparatus, an input voltage-to-frequency characteristic (V-f characteristic) of a voltage controlled oscillator for generating the transmission signal is stored in advance, a necessary voltage for generating a predetermined frequency is calculated from the input voltage-to-frequency characteristic, or a necessary voltage for transmitting the predetermined frequency is calculated by a method of referring to a table.

According to the invention, it is possible to detect a target even in a condition where the relative speed is zero, and it is also possible to detect a distance in high accuracy by separating plural targets which emerge on the same speed.

The other objects and methods of achieving the objects will be readily understood in conjunction with the description of embodiments of the present invention and the drawings.

BRIEF DESCRIPTION OF THE DRAWINGS

FIG. 7 is a flowchart showing a signal processing in the second embodiment;

DETAILED DESCRIPTION OF THE EMBODIMENTS

Hereinafter, embodiments of the invention will be described with reference to FIG. 1 to FIG. 17. The following embodiments are examples of a radar apparatus in the invention to be applied to a distance measuring apparatus for use in automobiles, but the invention is not limited to the foregoing application.

Figure 1:
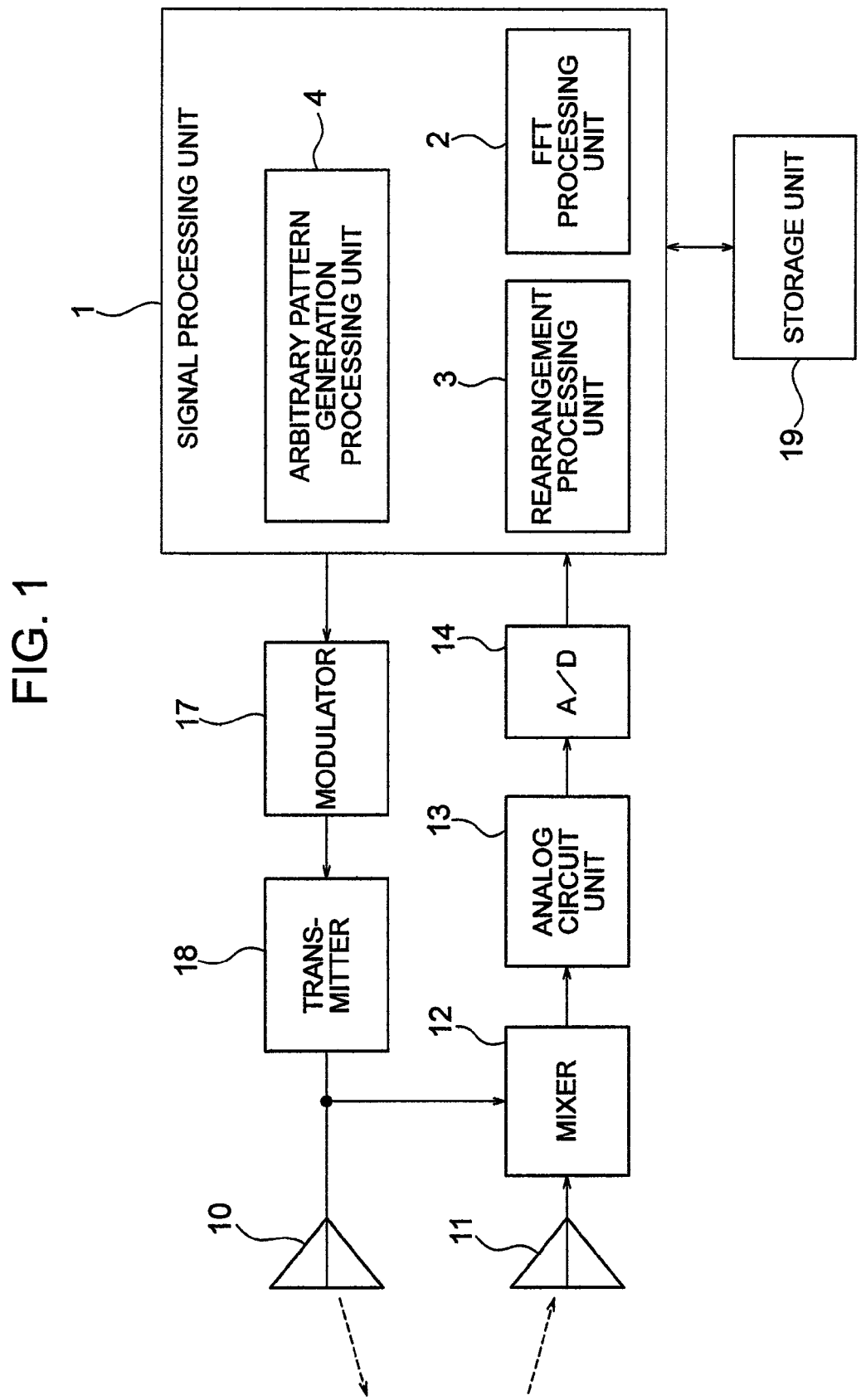
FIG. 1 is a block diagram showing a radar apparatus relative to the invention.

FIG. 1 is a block diagram showing a radar apparatus in the invention. Referring to FIG. 1, a transmitter 18 generates a transmission signal with a transmission frequency on the basis of a modulation signal from a modulator 17, and a high frequency signal generated from the transmitter is radiated from a transmission antenna 10. Generally, the distance measuring apparatus for use in the automobiles uses a signal of a millimeter-wave of 76 GHz or 24 GHz band, or a sub-millimeter-wave band. A radio signal reflected from a target (object under measurement) such as vehicles, obstacles, etc. is received from a reception antenna 11 to then give a frequency conversion by a mixer 12. Part of the output signal from the transmitter 18 is supplied to the mixer 12 through a directional coupler, and the signal from the transmitter 18 is mixed with the reception signal from the reception antenna 11 by the mixer 12 to generate a beat signal.

In the case where a radar system has a reception system of a homodyne-based system which converts directly to a base band, the beat signal outputted from the mixer 12 has a Doppler frequency.

The beat signal, outputted from the mixer 12, is then supplied to an analog-to-digital (A/D) converter 14 from an analog circuit unit 13 to convert into a digital signal, and to then supply to a FFT (Fast Fourier Transformation) processing unit 2. The FFT processing unit 2 processes a series of analog-to-digital converted data by a complex number Fourier transformation processing, so that frequency spectra of the beat signals are measured as amplitude information and phase information.

[First Embodiment]

Figure 2:
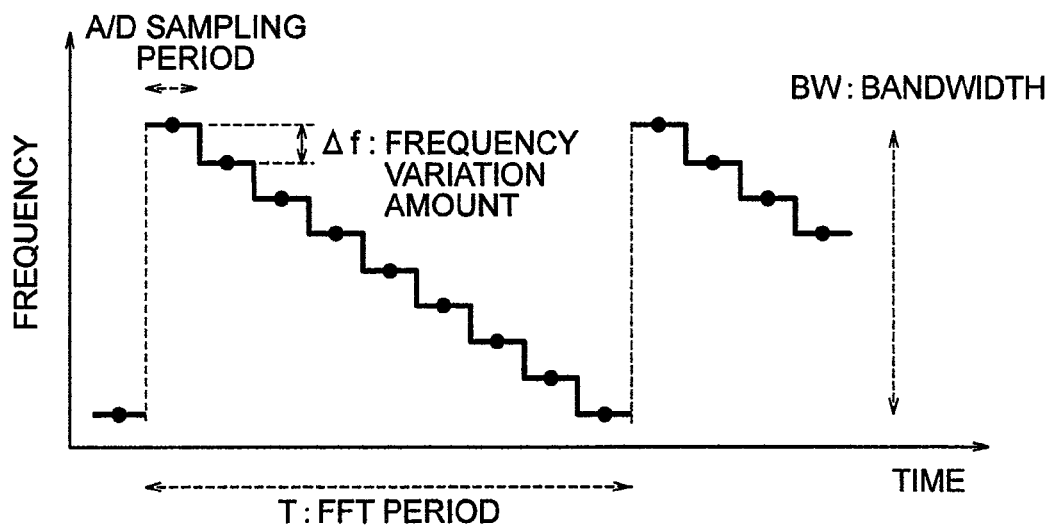
FIG. 2 is a diagram showing a frequency switching pattern of a transmission signal to be used for a distance measuring apparatus in a first embodiment of the invention.

FIG. 2 shows an example of a frequency pattern of a transmission signal supplied from the foregoing distance measuring apparatus in a first embodiment. Here, the frequency pattern is synchronized with an analog-to-digital sampling period, and uses a transmission wave, the frequency of which is decreased stepwise within a FFT period. The modulator 17 shown in FIG. 1 generates a voltage for controlling the transmitter 18 on the basis of a command value supplied from an arbitrary pattern generation processing unit 4 to then send to the transmitter 18. The transmitter 18 generates a predetermined frequency which is decreased with a variation amount $\Delta f$ stepwise, as shown in FIG. 2, to radiate it from the transmission antenna 10. Thereafter, A signal reflected from the target is received by the reception antenna 11, and converted into a low frequency beat signal by the mixer 12. The low frequency beat signal is then amplified by the analog circuit unit 13, and converted into digital data by the analog-to-digital converter 14. A transmission signal $Sn_t(t)$ is represented by the following expression (3).

$$Sn_t(t) = At \cdot \exp[(2\pi \cdot fn \cdot t + \phi_n)] \quad (3)$$

where At is an amplitude of the transmission signal, fn is a transmission frequency, and $\phi_n$ is an initial phase.

The reception signal is represented by the following expressions (4) and (5).

$$Sn_r(t) = Ar \cdot \exp[j\{2\pi \cdot fn \cdot (t - \tau(t)) + \phi_n\}] \quad (4)$$

where Ar is an amplitude of the reception signal, and $\tau$ is a delay time due to the distance.

$$\tau(t) = \frac{2 \cdot \text{Range}(t)}{c} \quad (5)$$

The beat signal supplied from the mixer 12 is represented by the following expression (6).

$$Sn_{IF}(t) = A_{IF} \cdot \exp[j\{2\pi \cdot fn \cdot t - 2\pi \cdot fn \cdot (t - \tau(t))\}] \quad (6)$$
$$= A_{IF} \cdot \exp[j\{2\pi \cdot fn \cdot \tau(t)\}]$$

The transmission frequency is synchronized with the analog-to-digital sampling period, and the transmission signal varying stepwise is represented by the following expression (7).

$$fn = f0 - \frac{n \cdot \Delta f}{T} t \quad (7)$$

where f0 is an initial value of the transmission frequency, n is an integer which is counted up from 0 to total number of samples in the FFT period. $\Delta f$ is a variation amount of the frequency.

According to the foregoing description, the reception beat signal is represented by the following expression (8).

$$Sn_{IF}(t) = A_{IF} \cdot \exp\left[j\left\{2\pi \cdot \left(f0 - \frac{n \cdot \Delta f}{T} t\right) \cdot \tau(t)\right\}\right] \quad (8)$$

Figure 3:
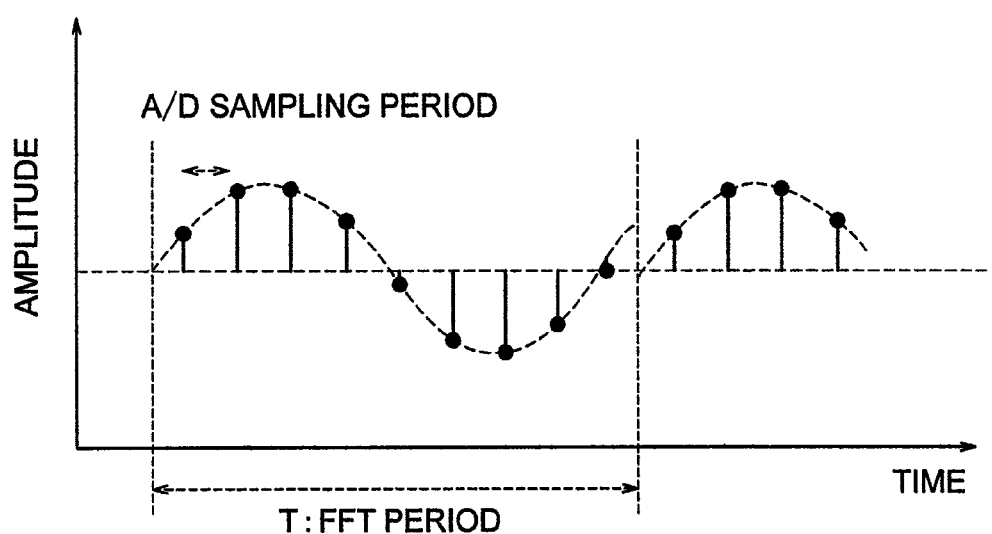
FIG. 3 is a diagram showing an example of a received beat signal which is sampled in an analog-to-digital sampling period.
Figure 4:
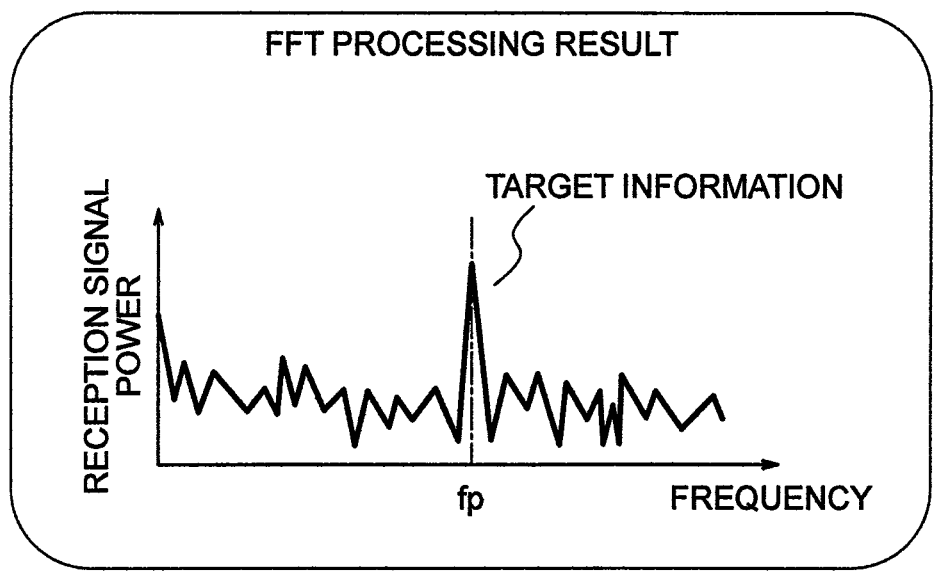
FIG. 4 is a diagram showing a spectrum waveform and frequency peak signal obtained from the FFT processing.

FIG. 3 shows an example of the reception beat signal which is sampled in the analog-to-digital sampling period. This waveform is a sinusoidal wave determined by a distance as far as the target and its relative speed, and steps in accordance with the transmission frequency which is varied stepwise. In the case where the distance as far as the target does not vary, the sinusoidal wave formed of connecting measured data at each of the steps is obtained as shown in FIG. 3, since the transmission is performed while the transmission frequency is varied stepwise. As the sampled reception data is stored by an amount during the FFT period to then be subject to the FFT processing, a frequency peak signal emerges in response to the distance as far as the target, as shown in FIG. 4. In the case of example shown in FIG. 4, a reflected signal from the target is emerged at a point of a frequency fp, and this frequency fp becomes a function determined by the distance as far as the target and its relative speed, and steps in accordance with the transmission frequency which is varied stepwise.

In the case where the distance as far as the target does not vary or the relative speed to the target is zero, a distance "Range" as far as the target can be obtained from the peak signal frequency fp in relation to the reflection from the target by the following expression (9).

$$\text{Range} = \frac{c}{2} \cdot \frac{T}{n \cdot \Delta f} \cdot fp \quad (9)$$

According to the expression (9), $n \cdot \Delta f$ designates a gradient of the transmission frequency which is varied stepwise. For example, assuming that the FFT period is 100 ms, and 1000 points every 1 MHz, that is, the transmission frequency is varied over 1000 MHz stepwise, an expression $(n \cdot \Delta f)/T = 1000$ MHz/sec is obtained.

Using this transmission wave, the distance as far as the target is calculated as 15 m from the expression (9) if the reception frequency from the target is $fp = 1000$ Hz.

Figure 5:
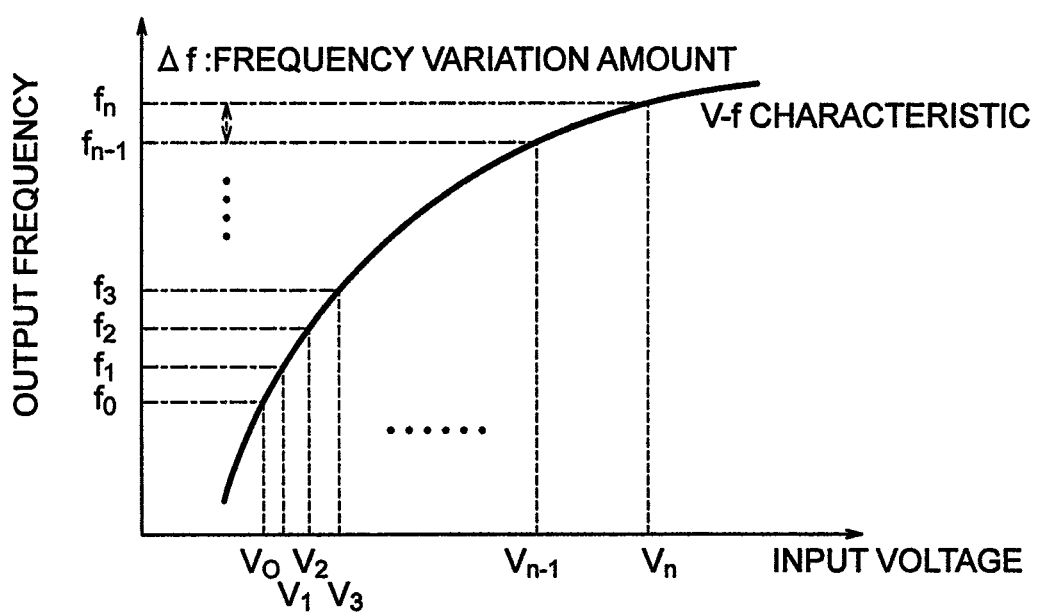
FIG. 5 is a diagram showing an input voltage-to-frequency characteristic (V-f characteristic) of a transmitter.

In the first embodiment, generally, the transmitter 18 has its inherent input voltage-to-frequency characteristic (V-f characteristic) as shown in FIG. 5. This V-f characteristic is stored in a storage unit 19 in advance. A necessary control voltage for generating a predetermined frequency is then obtained by using the stored V-f characteristic, or the control voltage is supplied to the transmitter 18 with reference to a table. In this way, the predetermined transmission frequency can be transmitted regardless of the characteristic of the transmitter 18.

In the case of example shown in FIG. 2, assuming that the transmission frequency variation amount is $\Delta f$, a frequency is set so that the transmission frequency is varied from $f_0$ to $f_n$ in even intervals stepwise. Next, voltages $V_0$ to $V_n$ necessary for transmitting the frequencies from $f_0$ to $f_n$ are measured and stored in a storage unit 19 in advance. The arbitrary pattern generation processing unit 4 in a signal processing unit 1 sets the control voltage to be supplied to the transmitter 18 through the modulator 17 on the basis of information of the voltages $V_0$ to $V_n$ stored in the storage unit 19 in advance. In this way, a modulation signal is supplied to the transmitter 18, so that the transmission frequencies can be transmitted while the frequency variation amount $\Delta f$ is kept constant, and the transmission frequencies are switched.

[Second Embodiment]

A second embodiment will be described with reference to FIG. 6 and FIG. 7. The first embodiment has used the transmission frequencies that are varied stepwise, as shown in FIG. 2. In the case of the second embodiment, the transmission frequencies are varied by synchronization with the analog-to-digital sampling period as shown in FIG. 6, however, its transmission frequency pattern uses a transmission frequency of an arbitrary random pattern in the FFT period.

Received signals are converted into digital signals by the analog-to-digital converter 14, after that, the order of sampling signals are rearranged by a rearrangement processing unit 3. The rearrangement processing unit 3 rearranges the analog-to-digital converted data in order similar to the case where the frequencies on transmission are varied stepwise, since the pattern on transmission is known. The rearranged data in the order is subject to the FFT processing in the FFT processing unit 2, so that the same processing as that in the first embodiment can be made.

Figure 6:
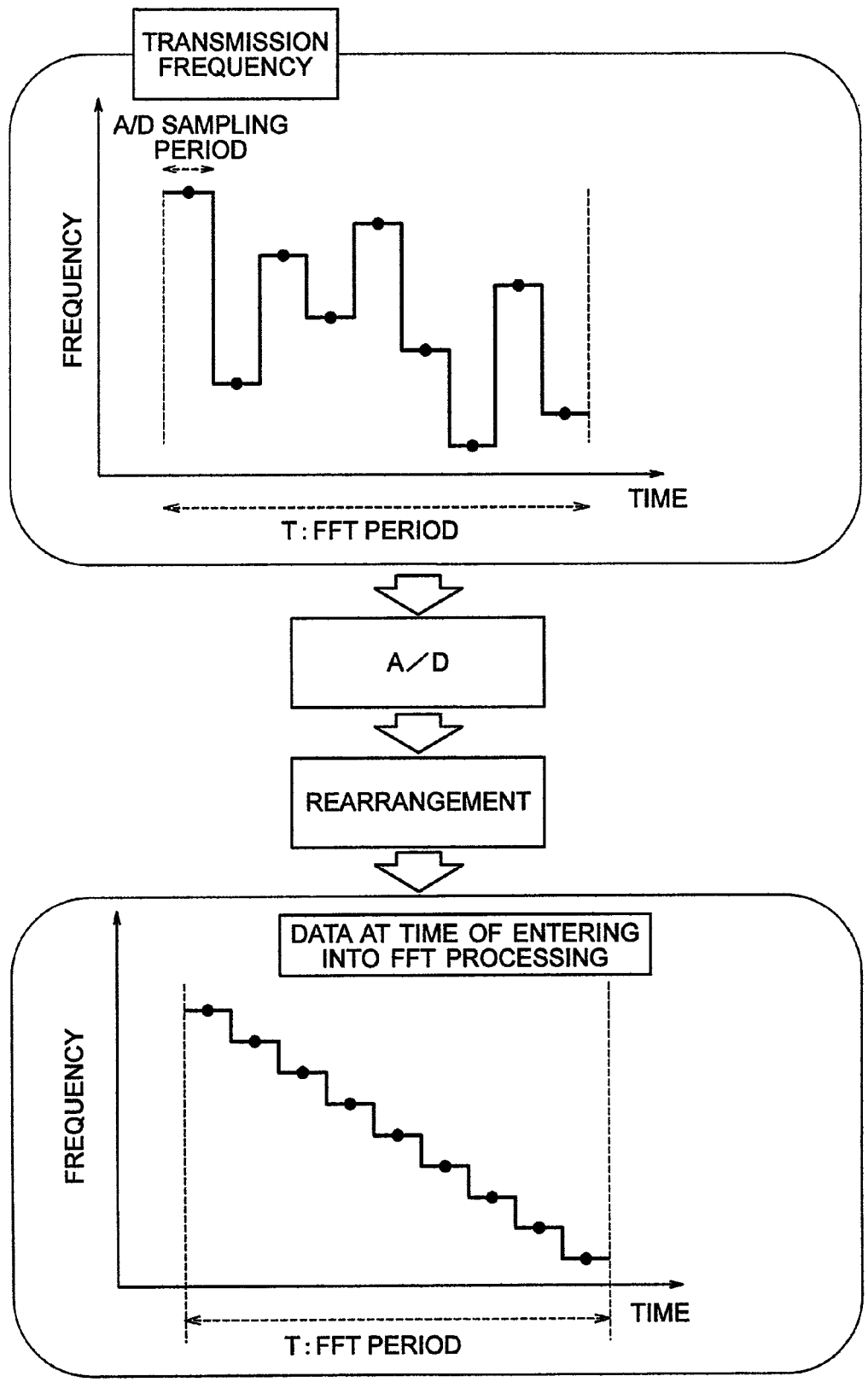
FIG. 6 is diagrams showing a random transmission frequency pattern of the transmission signal to be used for the distance measuring apparatus in a second embodiment of the invention, and a transmission frequency pattern after analog-to-digital sampling data is decoded in order.

An arbitrary pattern of the transmission frequencies shown in the upper part of FIG. 6 uses specifically a pseudo random code such as M-sequence code, Gold-sequence code, etc. Further, the arbitrary pattern is stored in the storage unit 19 in advance.

In the case where some sort of interfacial wave emerges on a midstream of the sequential transmission frequencies by causing the use of such pseudo random code, there is a merit to be able to make affection small on the interfacial wave.

A sequentially flown signal processing in the second embodiment will be described with use of FIG. 7. At a step 100, a radio wave is transmitted by using the arbitrary pattern. At a step 101, a signal reflected from a target is received to convert into digital data by the analog-to-digital converter 14. The analog-to-digital converted sampling data equal to or greater than the number of samples is stored for undergoing the FFT processing, and the analog-to-digital converted sampling data received by using the arbitrary pattern on the transmission is rearranged in order (referring to the lower part of FIG. 6) at a step 102. At a step 103, the sequential data is subject to the FFT processing. Finally, at a step 104, a peak signal reflected from the target obtained from a result of the FFT processing is measured to calculate a distance as far as the target and its relative speed from information containing a frequency, amplitude and phase of the peak signal.

[Third Embodiment]

Figure 8A:
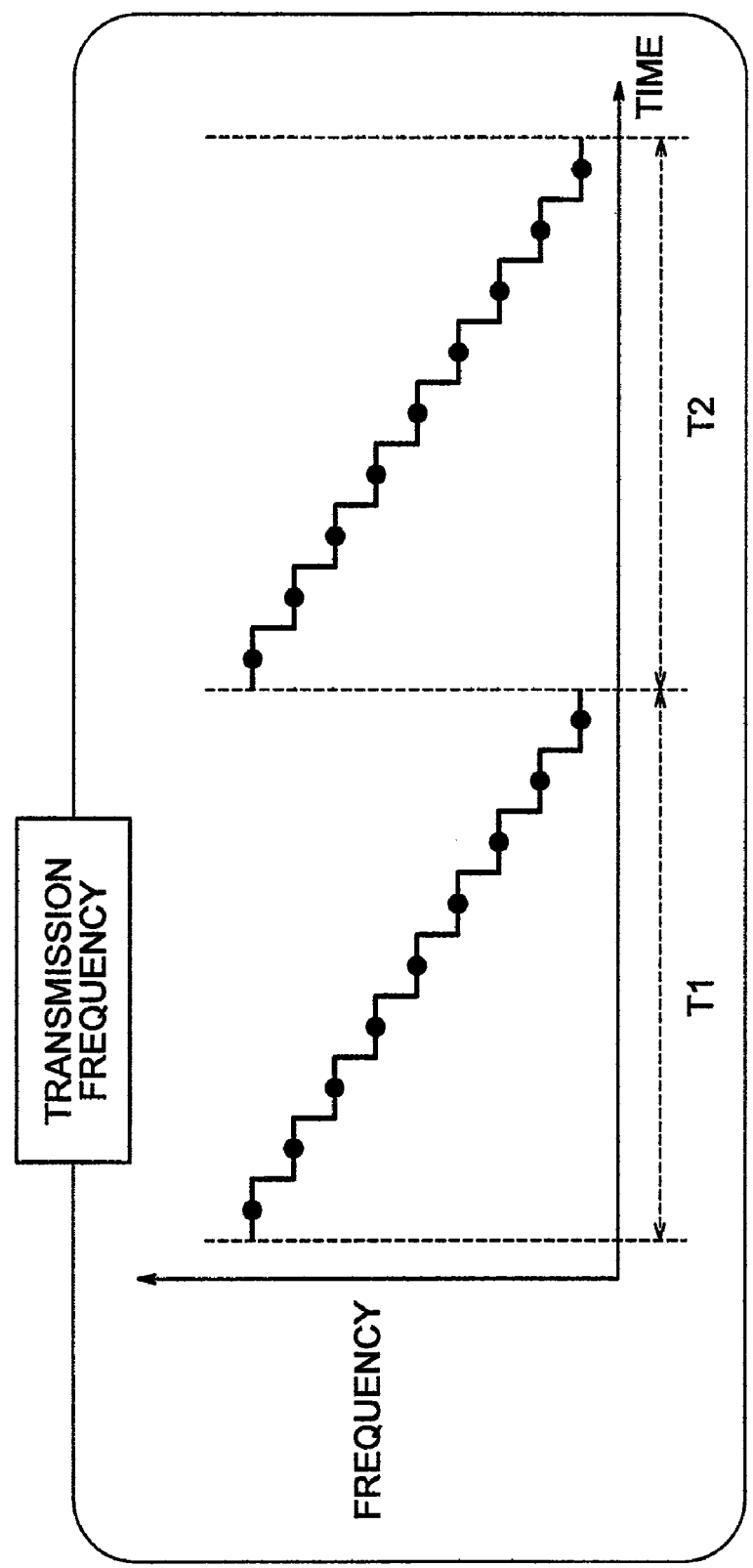
FIG. 8A is a diagram showing stepwise transmission frequency patterns of the transmission signal in a two-period amount (T1, T2) of an FFT period in a third embodiment.
Figure 8B:
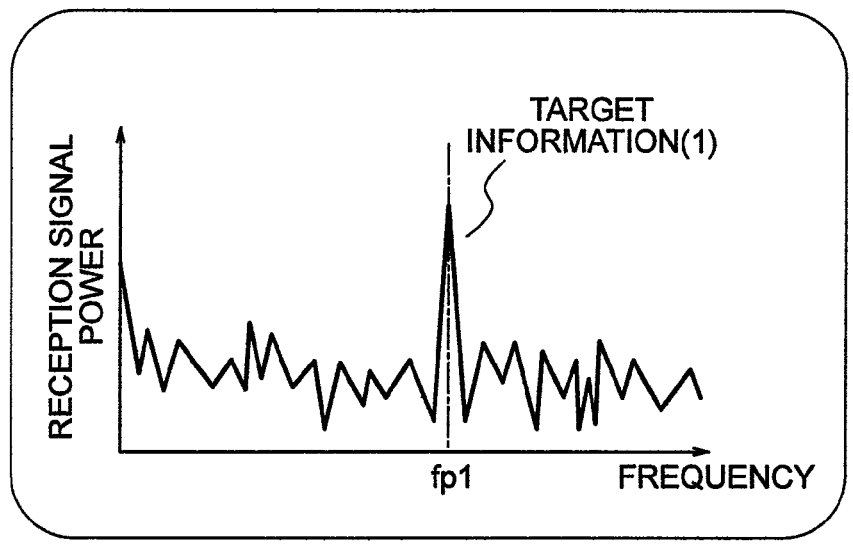
FIG. 8B is a diagram showing spectrum waveforms obtained from the FFT processing in each of the FFT periods in the third embodiment.
Figure 8C:
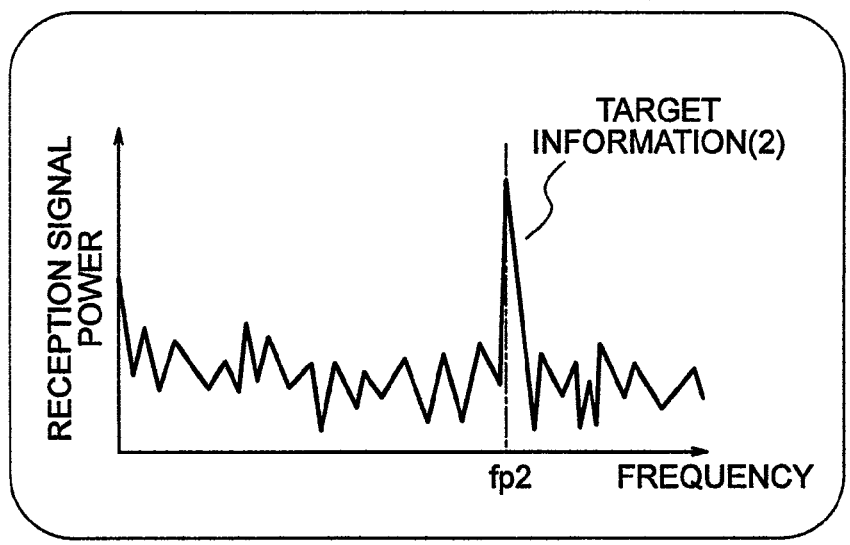
FIG. 8C is a diagram showing spectrum waveforms obtained from the FFT processing in each of the FFT periods in the third embodiment.

A third embodiment is concerned with a case where two series pieces of data in which transmission frequencies are varied stepwise is subject to the FFT processing. FIGS. 8A and 8B show transmission frequency patterns to be used for the FFT processing.

FIG. 8A shows, similarly to FIG. 2, transmission frequencies to be used for a method in which the frequencies to be transmitted are varied stepwise by synchronization with the analog-to-digital sampling period, that is, shows data of an amount of two FFT periods (T1, T2). In the case of the first embodiment described with use of the expression (9), the distance as far as the target does not vary. However, in the case where the relative speed emerges on the target, a frequency of a peak signal reflected from the target becomes one synthesized with components of the distance and relative speed. Assuming that an average value of the transmission frequencies between the FFT periods is fc, a peak signal frequency fp is represented by the following expression (10).

$$fp = \frac{2 \cdot \text{Rate}}{c} fc + \frac{n \cdot \Delta f}{T} \cdot \frac{2 \cdot \text{Range}}{c} \tag{10}$$

A difference $\Delta fp$ between a frequency $fp1$ of the peak signal at a time T1 and a frequency $fp2$ of the peak signal at a time T2 is represented by the following expression (11).

$$\Delta fp = fp2 - fp1 \tag{11}$$

Assuming that the variation of relative speed from the time T1 to T2 is minute, a variation amount of the distance is represented by the following expression (12).

$$\text{Range}(2) - \text{Range}(1) = \text{Rate} \cdot T \tag{12}$$

$\Delta fp$ is also represented by the following expression (13).

$$\begin{aligned}
\Delta fp &= fp2 - fp1 \\
&= \left( \frac{2 \cdot \text{Rate}}{c} fc + \frac{n \cdot \Delta f}{T} \frac{2 \cdot \text{Range}(2)}{c} \right) - \\
&\quad \left( \frac{2 \cdot \text{Rate}}{c} fc + \frac{n \cdot \Delta f}{T} \frac{2 \cdot \text{Range}(1)}{c} \right) \\
&= \frac{n \cdot \Delta f}{T} \frac{2 \cdot (\text{Range}(2) - \text{Range}(1))}{c} \\
&= \frac{2 \cdot n \cdot \Delta f \cdot \text{Rate}}{c}
\end{aligned} \tag{13}$$

The relative speed "Rate" is obtained from the following expression (14) by using the frequency difference $\Delta fp$ from the time T1 to T2.

$$\text{Rate} = \frac{c}{2 \cdot n \cdot \Delta f} \cdot \Delta fp \tag{14}$$

The expression (14) is again substituted for the expression (10), and the distance is obtained from the following expression (15).

$$\text{Range} = \frac{c \cdot T}{2n \cdot \Delta f}\left(fp - \frac{fc}{n \cdot \Delta f} \cdot \Delta fp\right) \quad (15)$$

As described above, the distance as far as the target and its relative speed can be obtained by using the result of two series of FFT processing.

[Fourth Embodiment]

Figure 9:
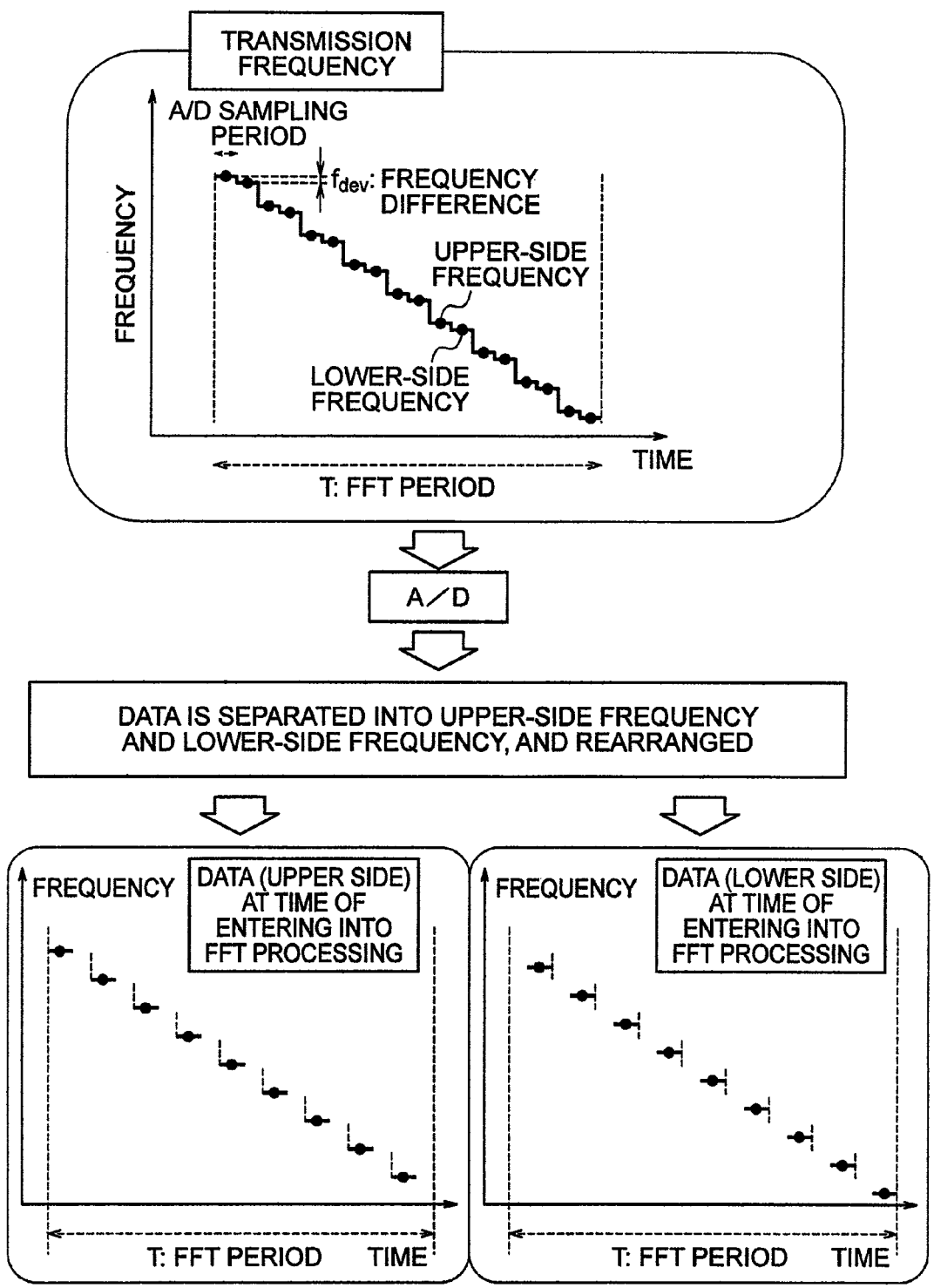
FIG. 9 is a diagram showing a transmission frequency pattern which is varied stepwise while two transmission frequencies having a minute frequency difference between them are switched one another on the basis of the principle of a dual-frequency CW method, and data which is separated and decoded after an analog-to-digital conversion, in a fourth embodiment.
Figure 10:
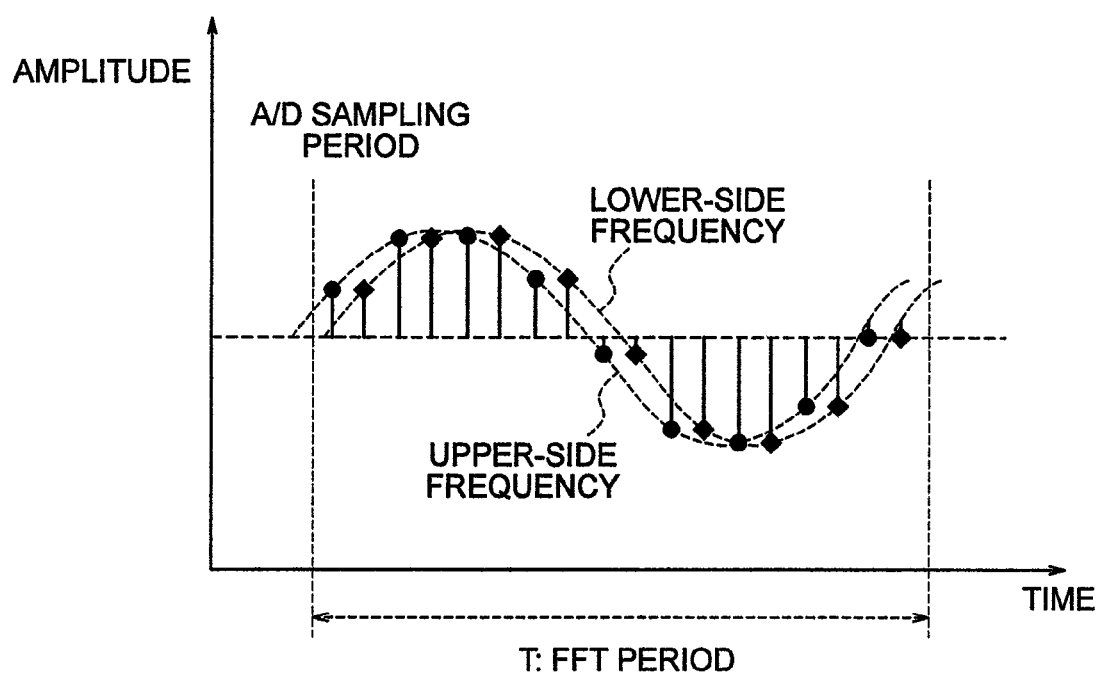
FIG. 10 is a diagram showing an example of an amplitude of the two transmission frequencies after the analog-to-digital conversion in the fourth embodiment.

A fourth embodiment will be described with use of FIG. 9 and FIG. 10. In the case where the distance between the radar and target is varied with a time, the frequency fp of the peak signal reflected from the target contains a Doppler frequency in accordance with the variation (relative speed) of distance. For this reason, the principle of dual-frequency CW method is utilized in this case so that a component (relative speed) and the distance of the Doppler frequency are separated and measured each other. As shown in FIG. 9, upper-side frequencies and lower-side frequencies, both of which are separated by a minute frequency difference $f_{dev}$, are transmitted as a transmission signal. The respective frequencies are varied stepwise by the frequency variation amount Δf, as similarly shown in FIG. 2. In the case of FIG. 9, the analog-to-digital sample period is made twice and high-speed, and data of the two frequencies or the upper-side and lower-side frequencies can be obtained from a single interval of the FFT period. These pieces of data are separated into the upper-side frequencies and lower-side frequencies to rearrange these data, so that two data strings, the transmission frequencies of which are varied stepwise, can be obtained as shown in the lower part of FIG. 9. The analog-to-digital converted data string in this case is shown in FIG. 10. In FIG. 10, these pieces of the analog-to-digital converted data are separated into and connected the upper-side frequencies with lower-side frequencies. These two reception signals are observed as two signals each having the same frequency, but having a different phase.

Figure 11A:
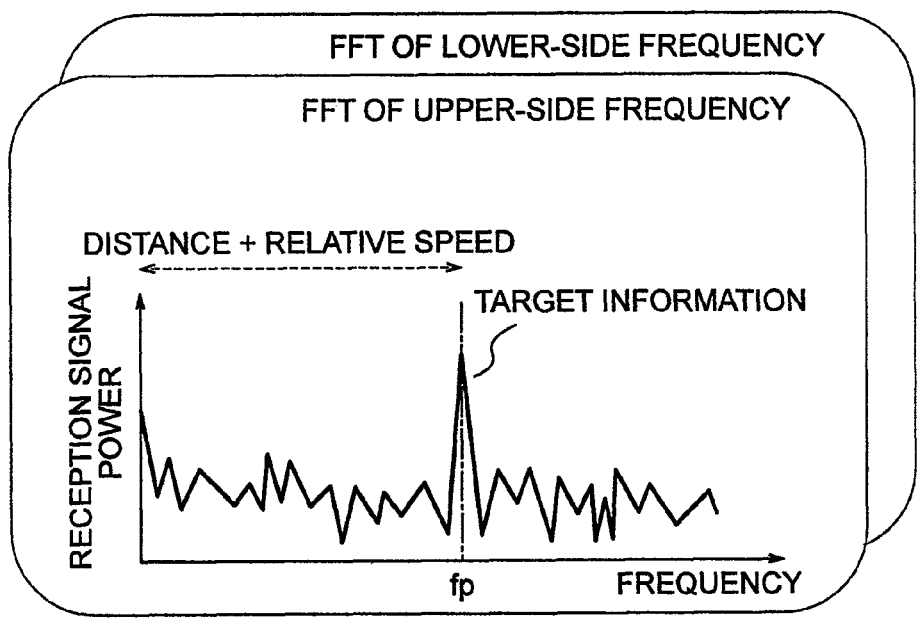
FIG. 11A is a diagram showing a spectrum waveform obtained from the FFT processing in the fourth embodiment.

The FFT processing is applied to the two reception signals or the upper-side and lower-side frequencies, so that spectrum information shown in FIG. 11A can be obtained. The reflected signal from the target is then emerged as a peak signal on the spectrum information. A frequency emerging the peak signal is one synthesized with the distance and relative speed as indicated by the expression (10).

Figure 11B:
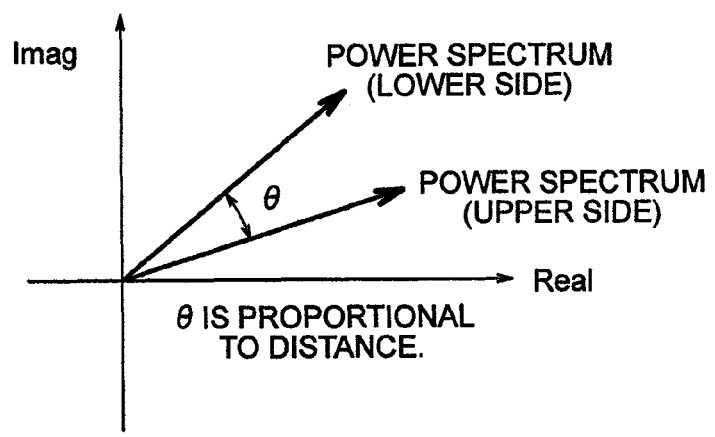
FIG. 11B is a diagram showing that two power spectra on a reception signal are represented on a complex plane in the fourth embodiment.

A difference between a phase angle of the peak signal obtained from the spectrum information of the upper-side frequency and a phase angle of the peak signal of the lower-side frequency is indicated by FIG. 11B. The distance "Range" is calculated by the same calculation method as the dual-frequency CW method, as indicated by the expression (2), since these pieces of phase angle information become the same power spectrum information as the dual-frequency CW method. A value of the relative speed "Rate" can be obtained from the calculated distance information "Range" and the frequency fp of the measured peak signal by using the expression (10). A difference between the upper-side and lower-side frequencies is about 300 KHz in the case of a long-range radar to be used for controlling a distance between the automobiles.

[Fifth Embodiment]

Figure 12:
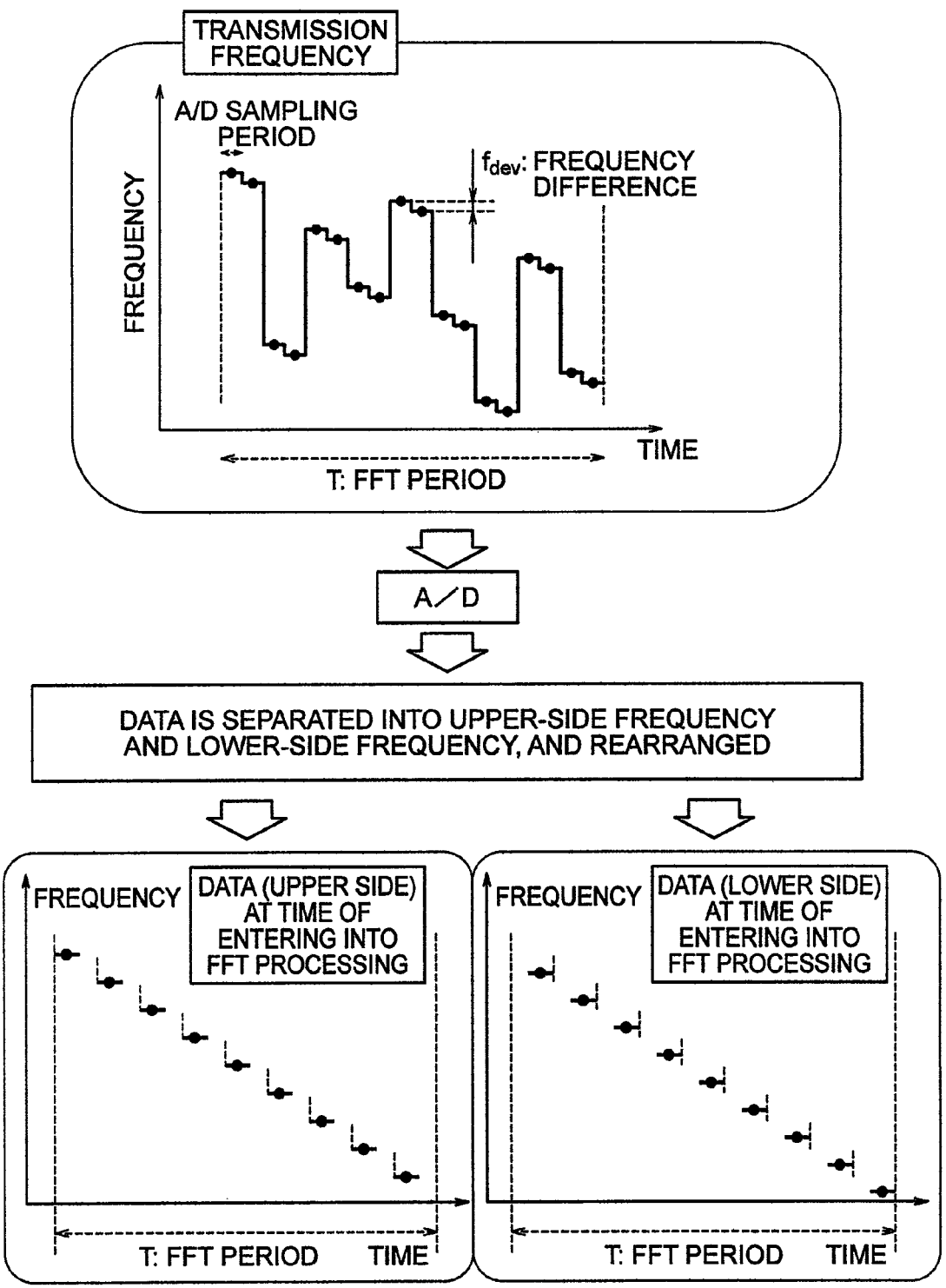
FIG. 12 is a diagram showing a transmission frequency pattern which is varied stepwise randomly while two transmission frequencies having a minute frequency difference between them are switched one another on the basis of the principle of the dual-frequency CW method, and data which is separated and decoded after the analog-to-digital conversion, in a fifth embodiment.

Next, another method of using the principle of dual-frequency CW method will be described with use of FIG. 12. In the case of FIG. 12, it is identical to the example in FIG. 9 that the transmission signal is transmitted as a set of the two frequencies corresponding to the upper-side and lower-side frequencies. However, the method in the fifth embodiment is that the set of the frequencies is transmitted while they are modulated by an arbitrary pattern on the basis of the FFT period. Received signals are converted into digital signals by the analog-to-digital converter 14, and the upper-side and lower-side frequencies are then separated and rearranged. The received analog-to-digital converted data is rearranged in order similar to the variation such that the upper-side and lower-side frequencies as frequencies on transmission are varied stepwise. The lower part of FIG. 12 shows a data concept which is rearranged stepwise. After the rearrangement as describe above, the processing which utilizes the principle of dual-frequency CW method similar to that described with FIG. 11 is applied to the data, so that the distance as far as the target and its relative speed can be calculated.

[Sixth Embodiment]

Figure 13:
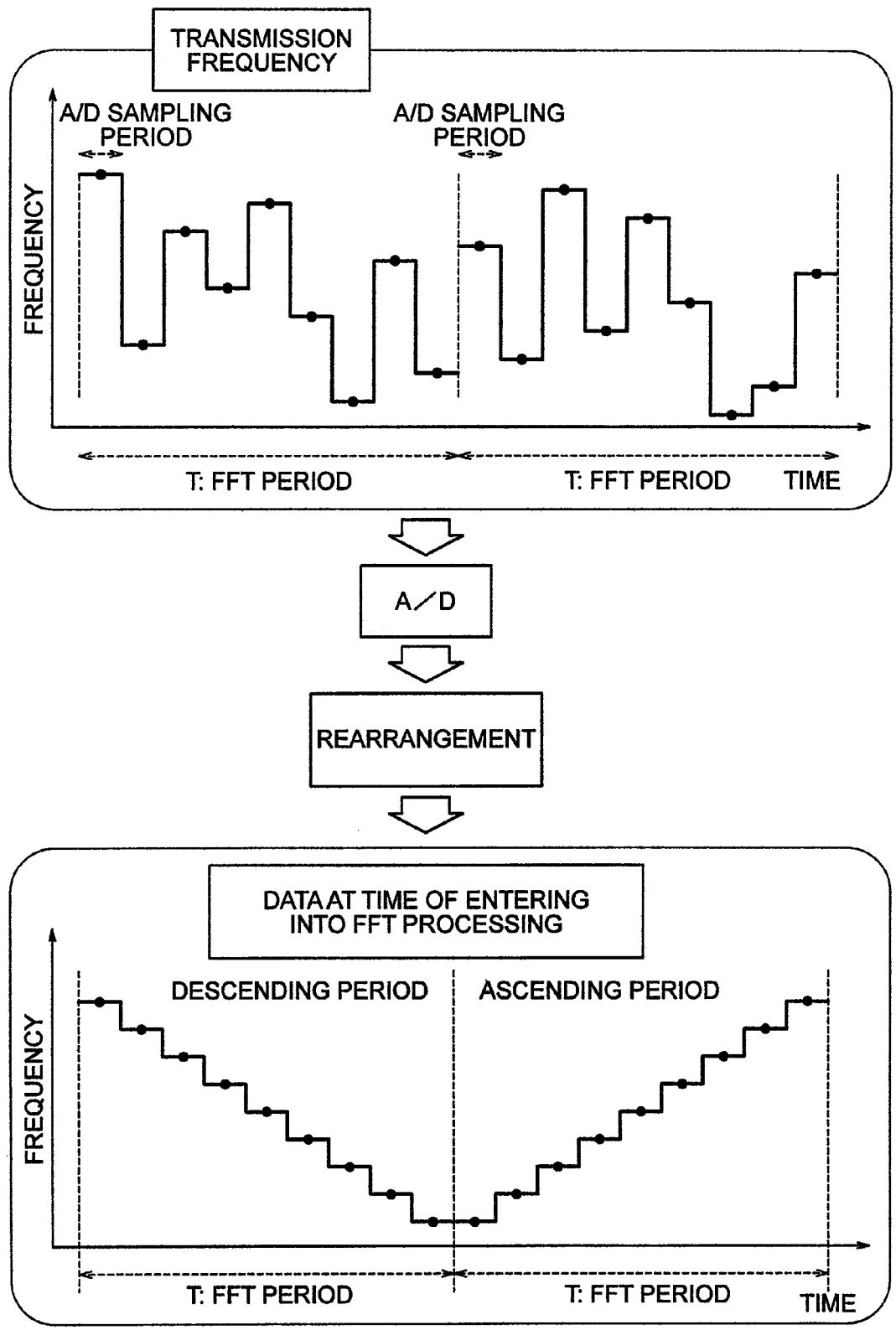
FIG. 13 is a diagram showing that the transmission frequencies are varied in accordance with an arbitrary pattern on the basis of the principle of FMCW method.
Figure 14A:
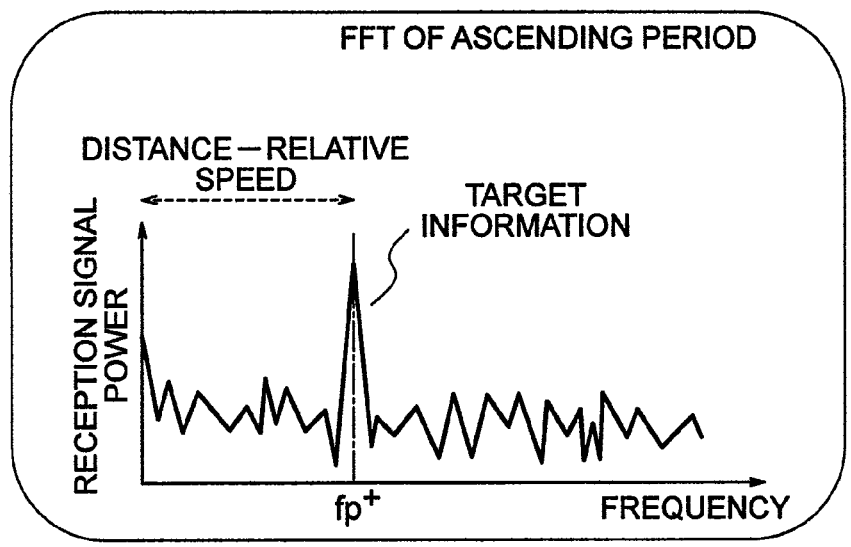
FIG. 14A is a diagram showing spectrum waveforms when the transmission frequencies are varied in accordance with the arbitrary pattern on the basis of the principle of FMCW method.
Figure 14B:
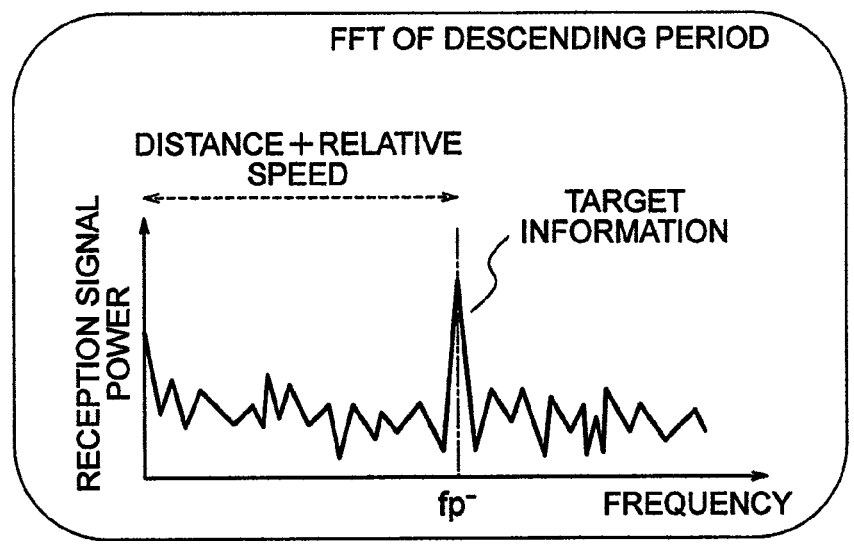
FIG. 14B is another diagram showing spectrum waveforms when the transmission frequencies are varied in accordance with the arbitrary pattern on the basis of the principle of FMCW method.

A sixth embodiment will be described with use of FIG. 13 and FIG. 14. A method to be described in this case uses a radar measurement principle of FMCW (Frequency Modulation Continuous Wave) method. As shown in FIG. 13, the transmission frequencies are varied by synchronization with the analog-to-digital sampling period, but its transmission frequency pattern is set to an arbitrary pattern on the basis of the FFT period. The arbitrary pattern is therefore transmitted over two FFT periods. FIG. 13 shows an example indicating that arbitrary patterns of frequencies to be transmitted are varied for a first FFT period and second FFT period.

Next, received signals are converted into digital signals by the analog-to-digital converter 14, after that, sampling signals are rearranged in order by the rearrangement processing unit 3. The rearrangement processing unit 3 rearranges the received analog-to-digital converted data in order similar to the variation such that the frequencies on transmission are varied stepwise, since the arbitrary pattern on transmission is known. At this time, the data is rearranged such that the frequency variation is descended stepwise for the first FFT period, and ascended stepwise for the second FFT period. The rearranged series data is supplied to the FFT processing unit 2 to undergo the FFT processing. A result of the FFT processing is shown in FIG. 14 as a spectrum waveform, that is, the results for a descending period and ascending period. Assuming that a peak signal frequency of target information obtained from the FFT processing in the ascending period is fp+, likewise, a peak signal frequency in the descending period is fp−, the respective frequencies are obtained from the distance "Range" as far as the target and its relative speed "Rate" by the following expressions (16) and (17).

$$fp += \frac{n \cdot \Delta f}{T} \cdot \frac{2 \cdot \text{Range}}{c} - \frac{2 \cdot \text{Rate}}{c} fc \quad (16)$$

$$fp -= \frac{n \cdot \Delta f}{T} \cdot \frac{2 \cdot \text{Range}}{c} + \frac{2 \cdot \text{Rate}}{c} fc \quad (17)$$

According to the peak signal frequencies obtained from the above, the distance as far as the target and its relative speed are calculated by the following expressions (18) and (19), similarly to the FMCW method.

$$\text{Range} = (fp + + fp -) \cdot c \cdot \frac{T}{4n \cdot \Delta f} \quad (18)$$

$$\text{Rate} = (fp - - fp +) \cdot \frac{c}{4fc} \quad (19)$$

[Seventh Embodiment]

Figure 15:
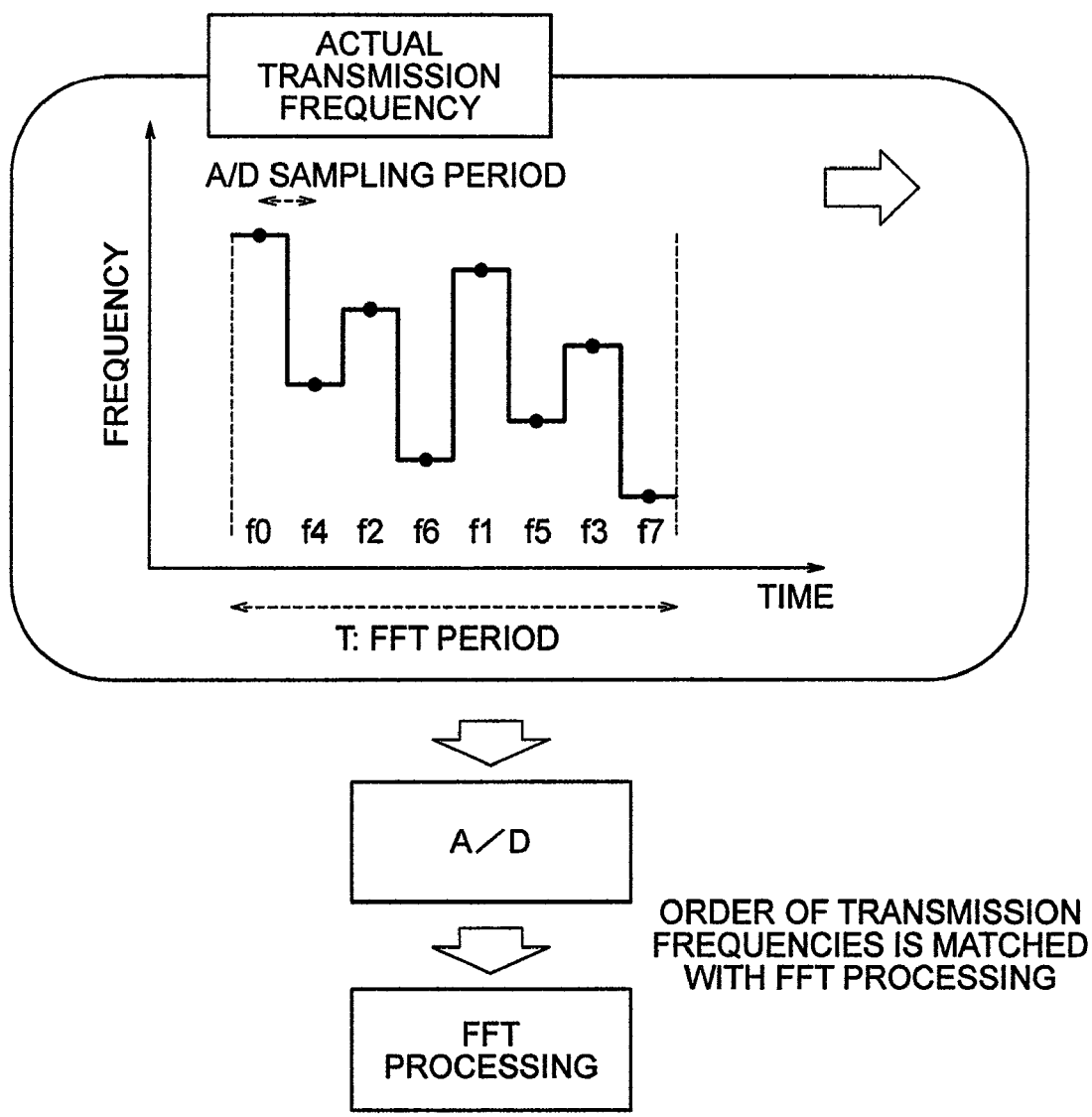
FIG. 15 is a diagram showing a transmission frequency pattern when the arbitrary pattern for switching the transmission frequency is used for a butterfly computation in the FFT processing.

A seventh embodiment will be described with use of FIG. 15.

The FFT processing is often utilized as a fast algorithm to convert time domain data into frequency domain data. There are a number of algorithms to be used for the FFT processing. However, in the case of calculation by radix-2 decimation in time, the data in the time domain can be outputted in order by rearranging the time domain data in advance and by repeating a butterfly computation. For example, in the case where the FFT processing is applied to eight pieces of data, input data (x0, x1, x2, x3, x4, x5, x6, x7) in the time domain is rearranged in order of (x0, x4, x2, x6, x1, x5, x3, x7), and then subject to the FFT processing to output in order of (x0, x1, x2, x3, x4, x5, x6, x7) of the frequencies in the frequency domain. Even in the case of a method in relation to the invention shown in FIG. 15, the frequencies to be transmitted are previously rearranged in order to be applicable to the butterfly computation. FIG. 15 shows an example indicating that eight frequencies are transmitted while they are switched, that is, the frequencies (f0, f4, f2, f6, f1, f5, f3, f7) are transmitted. Received signals are converted into digital signals by the analog-to-digital converter 14, and subject to the FFT processing without rearranging in order, so that the rearrangement for necessary data can be omitted, and the calculation time can be reduced.

[Eighth Embodiment]

Figure 16:
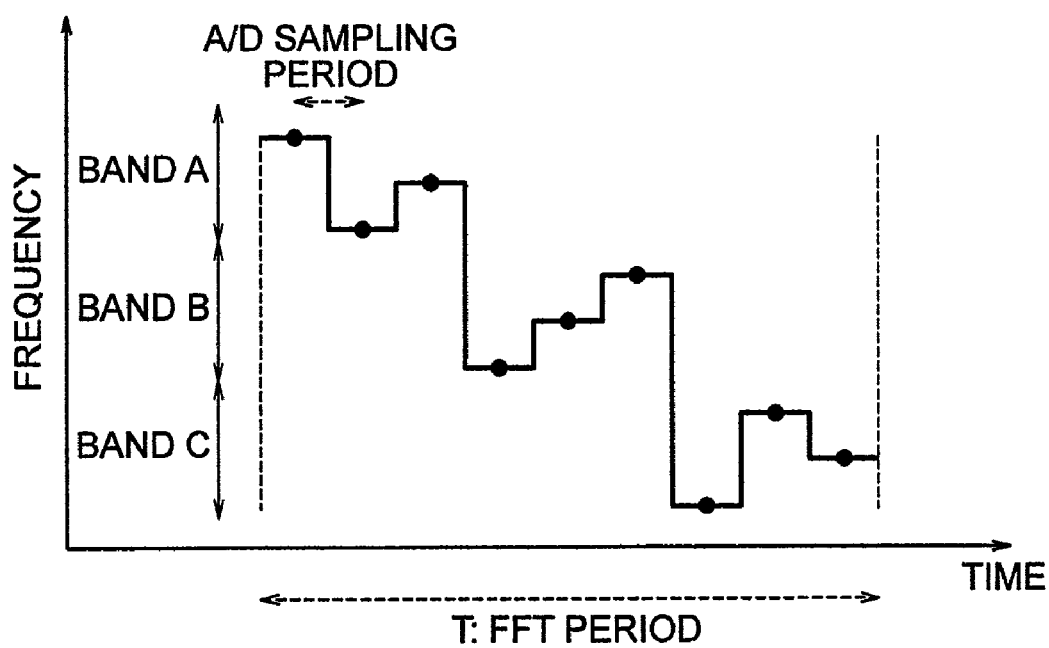
FIG. 16 is a diagram showing transmission frequencies in a method where a frequency band is divided to restrict a varying frequency width when the transmission frequencies are switched in accordance with the arbitrary pattern.

An eighth embodiment will be described with use of FIG. 16. In the case of the description relative to the embodiment in FIG. 6 and others, the frequencies to be transmitted are varied by synchronization with the analog-to-digital sampling period, and its transmission frequency pattern is set to a certain arbitrary pattern based on the FFT period. In the case of the embodiment in FIG. 16, a method indicates that the FFT period is separated more, and a band in which the frequency is varied in a separated time period is restricted. An amount of transiting the frequencies in a certain time period is restricted to shorten the transition time period from one to another frequency, so that a frequency stability after the transition can be enhanced.

[Ninth Embodiment]

Figure 17A:
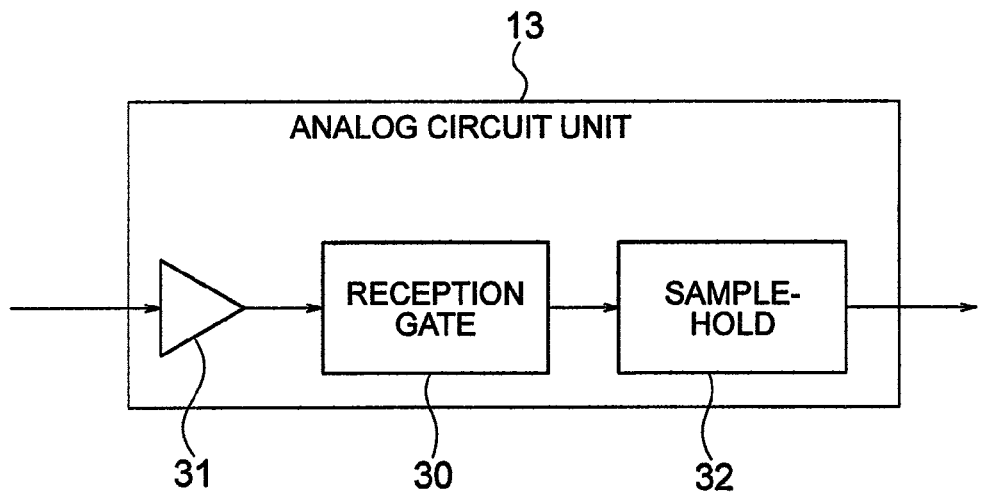
FIG. 17A is a block diagram showing an analog circuit unit as a reception circuit added with a reception gate
Figure 17B:
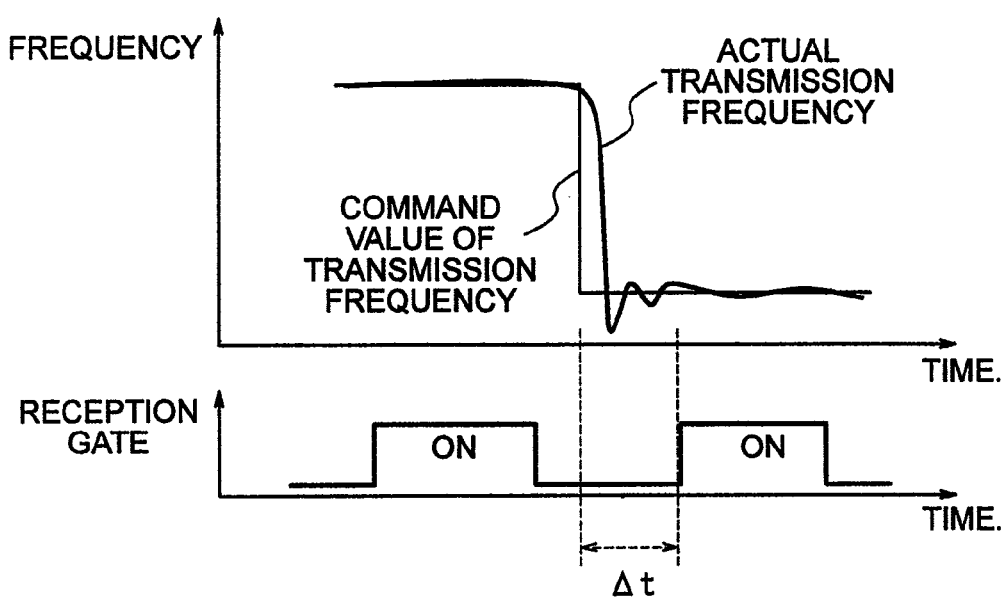
FIG. 17B is a diagram showing that the reception signal is turned On/Off.
Figure 18A:
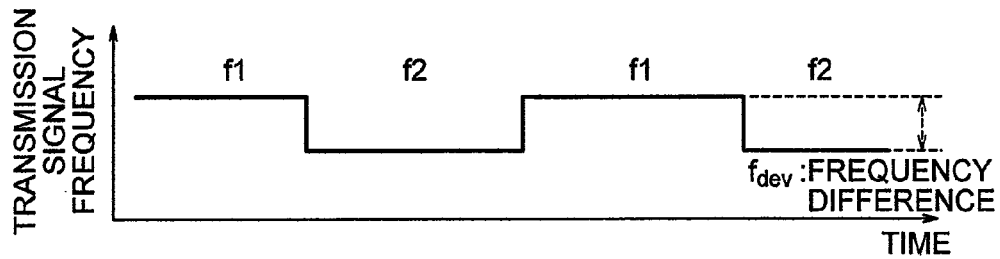
FIG. 18A is a diagram showing a waveform relative to the dual-frequency CW method as related technique.
Figure 18B:
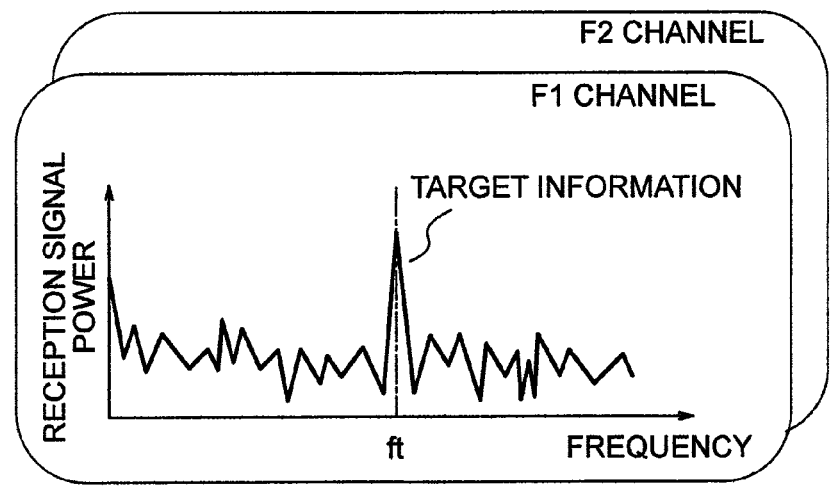
FIG. 18B is a diagram showing a spectrum waveform and frequency peak signal obtained from the FFT processing.
Figure 18C:
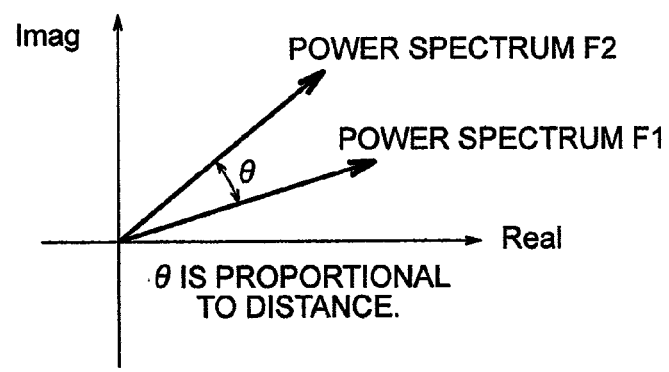
FIG. 18C is a diagram showing that two power spectra on the reception signal are represented on a complex plane.

A ninth embodiment will be described with use of FIGS. 17A and 17B. FIG. 17A shows an example of the analog circuit unit 13 containing an amplifier 31, a reception gate 30, and a sample-hold circuit 32. In the case where the transmission frequency is made varied stepwise, there is a tendency for an overshoot to arise from an actual transmission frequency dependent on a characteristic of the transmitter 18, in response to a command value of the transmission frequency as shown in FIG. 17B. For a purpose of reducing an adverse effect of such overshoot from the transmission frequency, the reception gate 30 is incorporated into the analog circuit unit 13.

As shown in FIG. 17B, the command value of the transmission frequency is transited, and the reception gate 30 is then turned On after elapsed by a predetermined time width Δt. Further, the reception gate 30 is turned Off at a time little before commanding the transition of a next frequency. A signal in a time period during which the reception gate 30 is turned On is held by the sample-hold circuit 32 to then convert into digital data by the analog-to-digital converter 14. In this way, the function of reception gate 30 is added to the analog circuit unit 13, so that the adverse effect of a frequency hunting so-called the overshoot and undershoot of the transmission frequency by causing the switching of the command value in the transmission frequency can be eliminated, enabling measurement in high accuracy.

The radar apparatus as described above can be used for a distance measuring apparatus to measure a distance from a vehicle or automobile in front of own one. The radar apparatus can also be used for a car-mounted radar device to measure a position, a direction, and a relative speed in relation to various targets which are found in front, side and rear directions. Further, it is possible to widely use the radar apparatus such as a ground radar to measure a traffic and monitor a specific spot.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A distance measuring apparatus comprising a transmitter to generate a transmission signal at a frequency that is adjusted stepwise; a transmission antenna to receive the transmission signal and radiate transmission radio waves; a reception antenna to receive reflected signals from a target; an analog-to-digital converter to perform an analog-to-digital conversion for converting reception signals; and a signal processing unit to process the converted signals and to detect the target,
wherein the frequency of the transmission signal received by the transmission antenna is adjusted at a timing synchronized by the signal processing unit with sampling periods of the analog-to-digital conversion.

2. The distance measuring apparatus according to claim 1, wherein the transmission signal is generated at a frequency that is continuous for each sampling period of the analog-to-digital conversion.

3. The distance measuring apparatus according to claim 1, further comprising a modulator that generates a voltage for controlling the transmitter based on an instruction value from a pattern generating unit, the transmitter switching the frequency that is adjusted stepwise based on a voltage input from the modulator.

4. The distance measuring apparatus according to claim 3, wherein switching the frequency that is adjusted stepwise is performed, by a Fourier transformation processing unit, to switch the frequency that is adjusted stepwise in accordance with the instruction value from the pattern generating unit.

5. The distance measuring apparatus according to claim 4, wherein the instruction value includes a butterfly computation pattern to be used by the Fourier transformation processing unit.

6. The distance measuring apparatus according to claim 3, further comprising a storage unit by which the instruction value is stored in advance, wherein the Fourier transformation processing unit executes processing after decoding the reception signals in accordance with the stored instruction value.

7. The distance measuring apparatus according to claim 3, wherein the pattern generating unit provides the instruction value in accordance with a pseudo random code.

8. The distance measuring apparatus according to claim 3, wherein the pattern generating unit provides the instruction value so that it has frequencies that are switched stepwise, while a predetermined frequency difference is kept constant.

9. The distance measuring apparatus according to claim 1, wherein a difference between a previous radio frequency and a present radio frequency is restricted so as not to exceed a predetermined frequency difference when the radio frequency is switched.

10. The distance measuring apparatus according to claim 1, further comprising a gate function to switch whether the reception signals are passed through upon reception, wherein the reception signals are prohibited from passing through for a predetermined time period from a time when the frequency is adjusted stepwise.

11. The distance measuring apparatus according to claim 10, wherein the predetermined time period is a stabilization time after the frequency is adjusted stepwise.

12. The distance measuring apparatus according to claim 1, further comprising a storage unit by which an input voltage-to-frequency characteristic of a voltage controlled oscillator for generating the transmission radio waves is stored in advance, wherein a necessary voltage for generating a predetermined frequency is determined from the input voltage-to-frequency characteristic or by referring to a table.

* * * * *